US011352874B2

(12) United States Patent
Wise et al.

(10) Patent No.: US 11,352,874 B2
(45) Date of Patent: Jun. 7, 2022

(54) DISTRIBUTED CONTROL SYSTEM USING ASYNCHRONOUS SERVICES IN A WELLBORE

(71) Applicant: Landmark Graphics Corporation, Houston, TX (US)

(72) Inventors: Matthew Edwin Wise, Sugar Land, TX (US); Egidio Marotta, Houston, TX (US); Keshava Prasad Rangarajan, Sugarland, TX (US)

(73) Assignee: Landmark Graphics Corporation, Houston, TX (US)

( * ) Notice: Subject to any disclaimer, the term of this patent is extended or adjusted under 35 U.S.C. 154(b) by 358 days.

(21) Appl. No.: 16/473,134

(22) PCT Filed: Dec. 7, 2018

(86) PCT No.: PCT/US2018/064504
§ 371 (c)(1),
(2) Date: Jun. 24, 2019

(87) PCT Pub. No.: WO2020/027861
PCT Pub. Date: Feb. 6, 2020

(65) Prior Publication Data
US 2021/0332696 A1 Oct. 28, 2021

Related U.S. Application Data

(60) Provisional application No. 62/713,789, filed on Aug. 2, 2018.

(51) Int. Cl.
*E21B 47/13* (2012.01)
*H04L 12/40* (2006.01)
*H04L 67/12* (2022.01)

(52) U.S. Cl.
CPC .............. *E21B 47/13* (2020.05); *H04L 12/40* (2013.01); *H04L 67/12* (2013.01)

(58) Field of Classification Search
CPC ......... E21B 47/12; E21B 47/13; H04L 12/40; H04L 67/12
See application file for complete search history.

(56) References Cited

U.S. PATENT DOCUMENTS 7,039,554 B2    5/2006  Nguyen et al.
8,044,821 B2 *  10/2011 Mehta ................ E21B 47/12
                                             340/855.7
(Continued)

FOREIGN PATENT DOCUMENTS

WO    2018106277 A1    6/2018

OTHER PUBLICATIONS

PCT/US2018/064504, "International Search Report and Written Opinion", dated May 2, 2019, 10 pages.

*Primary Examiner* — Franklin D Balseca
(74) *Attorney, Agent, or Firm* — Kilpatrick Townsend & Stockton LLP (57) ABSTRACT

Certain aspects and features relate to a system that efficiently determines optimal actuator set points to satisfy an objective in controlling equipment such as systems for drilling, production, completion or other operations associated with oil or gas production from a wellbore. A platform can receive data and also make use of and communicate with multiple algorithms asynchronously and efficiently to project automatic optimum set points for controllable parameters. Services can provide data over a real-time messaging bus and the data can be captured by an orchestrator that aggregates all data and calls a solver orchestrator to determine optimized parameters for a current state in time to send to control systems or display in a dashboard.

20 Claims, 9 Drawing Sheets

(56) References Cited

U.S. PATENT DOCUMENTS

| | | | |
|---|---|---|---|
| 9,822,590 B2* | 11/2017 | Deville | E21B 47/13 |
| 10,404,569 B2* | 9/2019 | Hershey | H04L 43/067 |
| 2011/0290562 A1* | 12/2011 | Standifird | E21B 21/08 |
| | | | 175/57 |
| 2016/0127254 A1 | 5/2016 | Kumar et al. | |
| 2017/0006135 A1 | 1/2017 | Siebel et al. | |
| 2017/0187785 A1 | 6/2017 | Johnson et al. | |
| 2017/0344910 A1 | 11/2017 | Wu | |
| 2018/0075544 A1 | 3/2018 | Passolt et al. | |

* cited by examiner

DISTRIBUTED CONTROL SYSTEM USING ASYNCHRONOUS SERVICES IN A WELLBORE

TECHNICAL FIELD

The present disclosure relates generally to devices for use in well. More particularly, the present disclosure relates to methods and systems for providing asynchronous, real-time adaptive control of a tool used in a well.

BACKGROUND

A well includes a wellbore drilled through a subterranean formation. The conditions inside the subterranean formation where wellbore tools are used can vary widely. For example, the formation through which a wellbore is drilled exerts a variable force on the drill bit of a drilling tool. This variable force can be due to the rotary motion of the drill bit, the weight applied to the drill bit, and the friction characteristics of each strata of the formation. A drill bit may pass through many different materials, rock, sand, shale, clay, etc., in the course of forming the wellbore and adjustments to various drilling parameters are sometimes made during the drilling process by a drill operator to account for observed changes. A similar process can be followed when tools and equipment for completion and production operations are used. The effectiveness of adjustments made by the operator is determined in the future by the success or failure of wellbore operations.

DETAILED DESCRIPTION

Certain aspects and features relate to a system that efficiently determines optimal actuator set points to satisfy an objective in controlling equipment such as systems for drilling, production, completion or other operations associated with oil or gas production from a wellbore. For purposes of some examples described herein, a digital twin can be an intermediary for the equipment. The optimum controllable set points can be computed, taking into account constraints and information obtained from distributed models, and the set points can be utilized for real-time, closed-loop control and automation or for advisory display.

Certain aspects and features provide a platform that can received data through an Internet-of-things (IoT) interface and make use of and communicate with multiple algorithms asynchronously and efficiently to project optimum set points for controllable parameters for optimization of operations such as drilling, pumping, production, or completion along with any constraints. The methodology aids in fast and efficient computation of the required set points. The algorithms can include multiple microservices and analytics apps, each of which can be referred to as a service. Each service can provide data over a real-time messaging bus asynchronously and the data can be obtained by a central orchestrator that aggregates all data and calls a solver engine to determine optimized parameters for a current state in time to send to control systems or display in a dashboard. The central orchestrator that aggregates data asynchronously can call the solver engine based on a time-based trigger coming from an original data source in a real-time feed.

In some examples, a system includes wellbore equipment and a processing device communicatively coupled to the wellbore equipment. A non-transitory memory device includes instructions that are executable by the processing device to cause the processing device to perform operations. The operations include asynchronously receiving telemetry at one or more orchestrators communicatively coupled to a real-time messaging bus (RTMB), calling a service to obtain results based on the telemetry, publishing the results on the real-time messaging bus for the orchestrators to consume, and retraining or updating one or more models distributed among the orchestrators using the results. The operations further include solving for an objective using one or more of the models to produce set points for controlling the wellbore equipment and sending the set points to an advisory display or the wellbore equipment.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
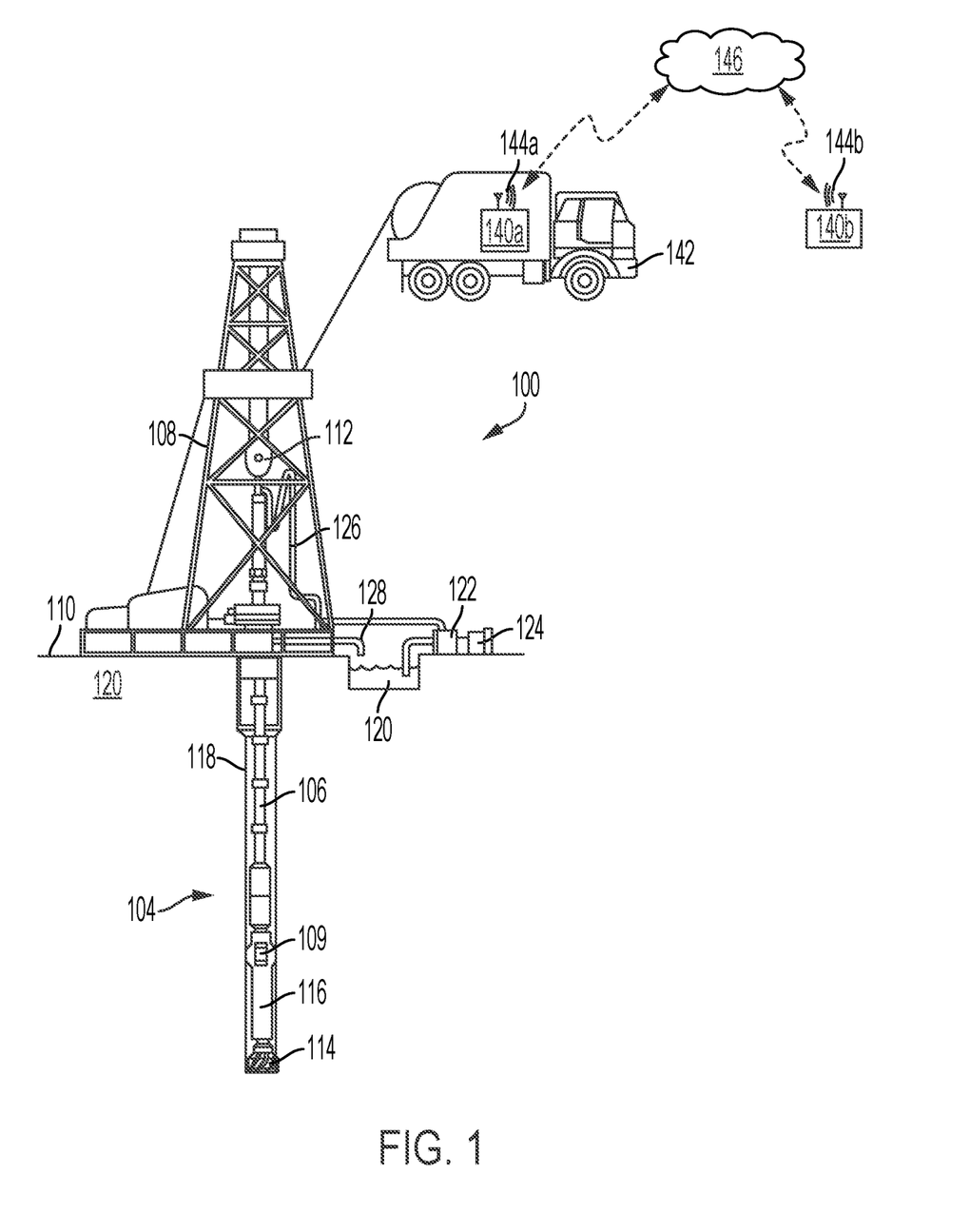
FIG. 1 is a cross-sectional view of an example of a drilling arrangement that includes a system for real-time asynchronous control of a drilling tool according to some aspects of the disclosure.

FIG. 1 is a cross-sectional view of an example of a well system 100 that may employ one or more principles of the present disclosure. A wellbore may be created by drilling into the earth 102 using the drilling system 100. The drilling system 100 may be configured to drive a bottom hole assembly (BHA) 104 positioned or otherwise arranged at the bottom of a drillstring 106 extended into the earth 102 from a derrick 108 arranged at the surface 110. The derrick 108 includes a kelly 112 used to lower and raise the drillstring 106. The BHA 104 may include a drill bit 114 operatively coupled to a tool string 116, which may be moved axially within a drilled wellbore 118 as attached to the drillstring 106. Tool string 116 may include one or more sensors 109 to determine conditions of the drill bit and wellbore and return values for various parameters to the surface through cabling (not shown) or by wireless signal. The combination of any support structure (in this example, derrick 108), any motors, electrical connections, and support for the drillstring and tool string may be referred to herein as a drilling arrangement.

During operation, the drill bit 114 penetrates the earth 102 and thereby creates the wellbore 118. The BHA 104 provides control of the drill bit 114 as it advances into the earth 102. Fluid or "mud" from a mud tank 120 may be pumped downhole using a mud pump 122 powered by an adjacent power source, such as a prime mover or motor 124. The mud may be pumped from the mud tank 120, through a stand pipe 126, which feeds the mud into the drillstring 106 and conveys the same to the drill bit 114. The mud exits one or more nozzles (not shown) arranged in the drill bit 114 and in the process cools the drill bit 114. After exiting the drill bit 114, the mud circulates back to the surface 110 via the annulus defined between the wellbore 118 and the drillstring 106, and in the process returns drill cuttings and debris to the surface. The cuttings and mud mixture are passed through a flow line 128 and are processed such that a cleaned mud is returned down hole through the stand pipe 126 once again.

Still referring to FIG. 1, the drilling arrangement and any sensors 109 (through the drilling arrangement or directly) are connected to a computing device 140a. In FIG. 1, the computing device 140a is illustrated as being deployed in a vehicle 142, however, a computing device to receive data from sensors 109 and control drill bit 114 of the drilling tool can be installed in a building such as a dog house, be hand-held, or be remotely located. In some examples, the computing device 140a can process at least a portion of the data received and can transmit the processed or unprocessed data to another computing device 140b via a wired or wireless network 146. The other computing device 140b can be offsite, such as at a data-processing center or be located near computing device 140a. Either or both computing device can execute computer program code instructions that enable a processor to act as an orchestrator, service, or microservice. The computing devices 140a-b can include a processor interfaced with other hardware via a bus and a memory, which can include any suitable tangible (and non-transitory) computer-readable medium, such as RAM, ROM, EEPROM, or the like, can embody program components that configure operation of the computing devices 140a-b. In some aspects, the computing devices 140a-b can include input/output interface components (e.g., a display, printer, keyboard, touch-sensitive surface, and mouse) and additional storage.

The computing devices 140a-b can include communication devices 144a-b. The communication devices 144a-b can represent one or more of any components that facilitate a network connection. In the example shown in FIG. 1, the communication devices 144a-b are wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication devices 144a-b can use acoustic waves, surface waves, vibrations, optical waves, or induction (e.g., magnetic induction) for engaging in wireless communications. In other examples, the communication devices 144a-b can be wired and can include interfaces such as Ethernet, USB, IEEE 1394, or a fiber optic interface. The computing devices 140a-b can receive wired or wireless communications from one another and perform one or more tasks based on the communications. These communications can include communications over the RTMB, which may be implemented virtually over any kind of physical communication layer. The computing resources shown as examples herein can be scaled to multiple equipment arrangements and can communicate under the control of an orchestrator. Orchestrators are further described below. Transmission between computing devices can be supported through data replication. It cannot be overemphasized that the drilling system shown above is but an example. The distributed system described herein can also be used with other equipment. Non-limiting examples include equipment used for production, completion, exploration, or reservoir development.

Figure 2:
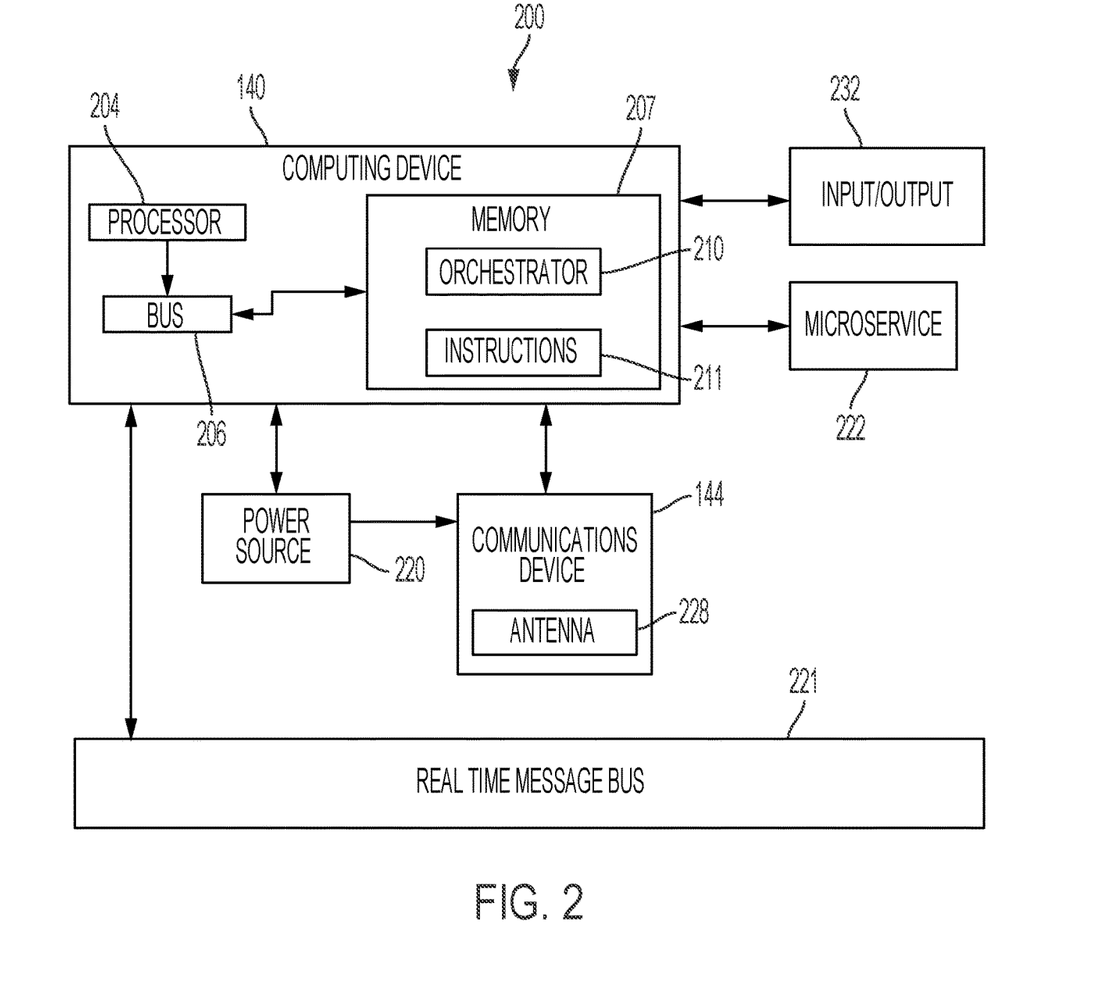
FIG. 2 is a block diagram of a system for real-time asynchronous control of a drilling tool according to some aspects of the disclosure.

FIG. 2 is a block diagram of an example of a system 200 for implementing all or a portion of a real-time optimization platform (RTOP) according to some aspects. For example, system 200 may be used to implement one or more orchestrators. In some examples, the components shown in FIG. 2 (e.g., the computing device 140, power source 220, and communications device 144) can be integrated into a single structure. For example, the components can be within a single housing. Real-time message bus 221 can be included in the computing device as well, or alternatively can be separate. Microservice 222 can also be included in computing device 140 or be separate. In other examples, most or all of the components shown in FIG. 2 can be distributed (e.g., in separate housings) and in electrical communication with each other.

The system 200 includes a computing device 140. The computing device 140 can include a processor 204, a memory 207, and an internal bus 206. The processor 204 can execute one or more operations of computer program code instructions 210 for implementing an orchestrator or computer program code instructions 211 for carrying out other operations related to real-time, asynchronous control of wellbore equipment and in connection with various services, including a remote message queueing (RMQ) server. The processor 204 can execute instructions stored in the memory 207 to perform the operations. The processor 204 can include one processing device or multiple processing devices. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the internal bus 206. The non-volatile memory 207 may include any type of memory device that retains stored information when powered off. Non-limiting examples of the memory 207 include electrically erasable and programmable read-only memory ("EEPROM"), flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The system 200 can include a power source 220. The power source 220 can be in electrical communication with the computing device 140 and the communications device 144. In some examples, the power source 220 can include a battery or an electrical cable (e.g., a wireline). In some examples, the power source 220 can include an AC signal generator. The computing device 140 can operate the power source 220 to apply a transmission signal to the antenna 228. For example, the computing device 140 can cause the power source 220 to apply a voltage with a frequency within a specific frequency range to the antenna 228. This can cause the antenna 228 to generate a wireless transmission. In other examples, the computing device 140, rather than the power source 220, can apply the transmission signal to the antenna 228 for generating the wireless transmission.

The system 200 can also include the communications device 144. The communications device 144 can include or can be coupled to the antenna 228. In some examples, part of the communications device 144 can be implemented in software. For example, the communications device 144 can include instructions stored in memory 207. The communications device 144 can receive signals from remote devices and transmit data to remote devices (e.g., the computing device 140b of FIG. 1). For example, the communications device 144 can transmit wireless communications that are modulated by data via the antenna 228. In some examples, the communications device 144 can receive signals (e.g., associated with data to be transmitted) from the processor 204 and amplify, filter, modulate, frequency shift, and otherwise manipulate the signals. In some examples, the communications device 144 can transmit the manipulated signals to the antenna 228. The antenna 228 can receive the manipulated signals and responsively generate wireless communications that carry the data.

The system 200 can receive input from sensor(s) 109, shown in FIG. 1. System 200 in this example also includes input/output interface 232. Input/output interface 232 can connect to a keyboard, pointing device, display device, and other computer input/output devices. An operator may provide input using the input/output interface 232. An operator may also view an advisory display of set points or other information such as a dashboard on a display screen included in input/output interface 232.

Figure 3:
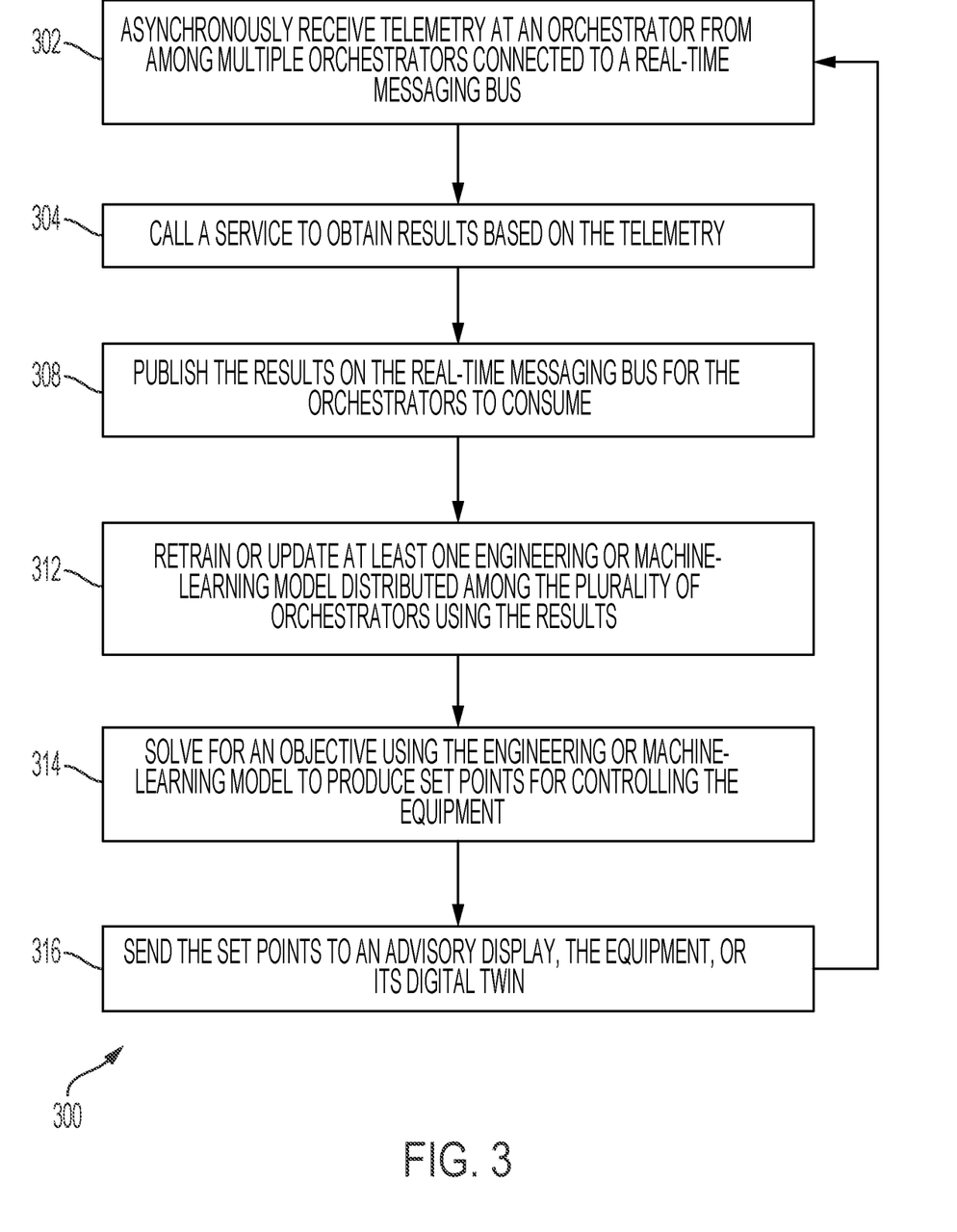
FIG. 3 is a flowchart of a process for real-time asynchronous control of a drilling tool according to some aspects of the disclosure.

FIG. 3 is an example of a flowchart of a process 300 for real-time asynchronous control of a drilling tool according to some aspects of the disclosure. At block 302, the system asynchronously receives telemetry at one of the orchestrators communicatively coupled to the real-time messaging bus 221. At block 304, processor 204 calls a service to obtain results based on the telemetry. At block 308, the processor publishes the results on the RTMB 221 for the orchestrators to consume. At block 312, at least one engineering or machine-learning model distributed among the orchestrators is updated or retrained using the results. In some aspects, an engineering model is updated while a machine-learning model is retrained. At block 314, processor 204 uses the engineering or machine-learning model to solve for one or more objectives, producing set points for controlling the equipment. The system can solve for a single objective or multiple objectives simultaneously. At block 316, processor 204 sends the set points to an advisory display, the equipment, or its digital twin.

Figure 4:
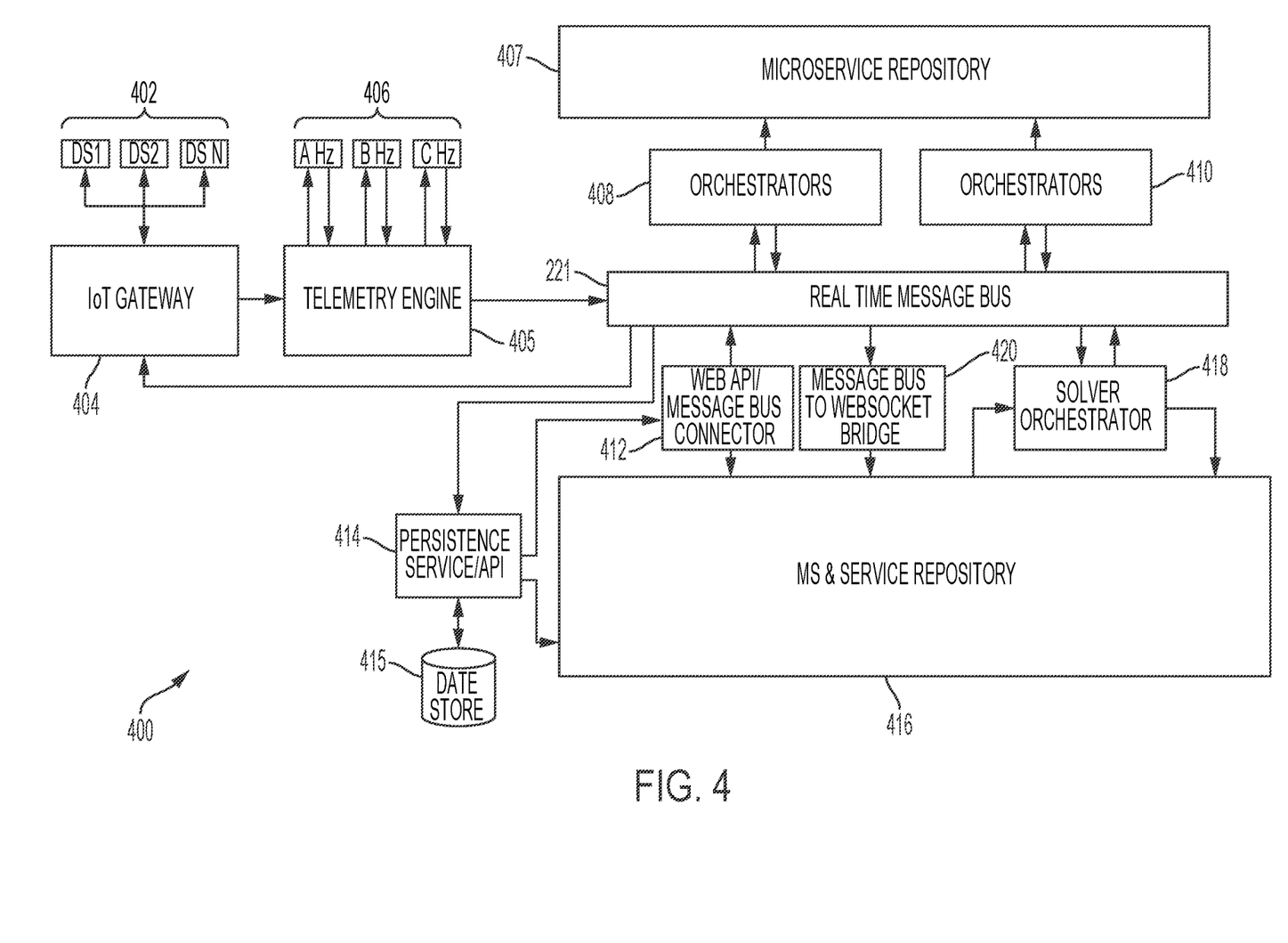
FIG. 4 is a diagram of a software architecture for real-time asynchronous control of a drilling tool according to some aspects of the disclosure.

FIG. 4 is a diagram of a software architecture for RTOP 400 that can provide real-time asynchronous control of a drilling tool according to some aspects of the disclosure. The RTOP according to some aspects allows real-time data to be consumed by various services asynchronously. The output of these various services is used in solving for an objective. Such a platform can be put into place to optimize drilling parameters in order to solve for a defined objective such as maximizing rate-of-penetration (ROP). The platform can also solve for multiple objectives, for example, maximizing ROP and minimizing mechanical specific energy (MSE). Real-time telemetry data in FIG. 4 can be consumed by digital sensors 402 (DS 1, DS 2, DS N) from a variety of external sources. These sources, as examples, can include rig equipment, downhole equipment, surface control equipment, or digital representations (digital twins) of those equipment. The data is ingested through the Internet-of-things (IoT) gateway 404 rather than directly by the applications sitting on the RTOP. Therefore, new data sources can come onboard without modifying the underlying applications. The IoT gateway 404 is responsible for standardizing data from any external data source into a common model that applications sitting on the platform understand. The IoT gateway 404 is also responsible for de-standardizing data to control systems in the outbound direction. IoT gateway 404 includes control system and internal system drivers.

Still referring to FIG. 4, telemetry engine 405 processes telemetry data. The engine removes statistical outlier data points and can also smooth data across various frequencies provided by frequency inputs 406. Some example frequencies are 1 Hz, 0.2 Hz, and 1 point output per 0.1 ft. Greater or lesser values can be used. Output of each telemetry operation produces telemetry that is sent out on the RTMB. The microservice repository 407 is communicatively coupled to orchestrators 408 for machine-learning models 1-N and orchestrators 410 for engineering models 1-N. Microservice repository 407 includes training and prediction microservices for machine-learning models 1-N and microservices for engineering models 1-N. All of the orchestrators are communicatively coupled to RTMB 221. A connector 412 for a Web application programming interface (API) and a persistence service API 414 are communicatively coupled to each other and to microservices (MS) and service repository 416. API 414 also accesses data store 415, where previous data from the current optimization is cached. Repository 416 provides control and display dashboards like that discussed below with respect to FIGS. 7-9 as well as microservices to select the best model to use in providing set points, service the solver orchestrator 418, and provide prediction support for the machine-learning models 408 and the engineering models 410. Bridge 420 communicatively couples the RTMB to a WebSocket for use in the real-time display dashboard.

Figure 5:
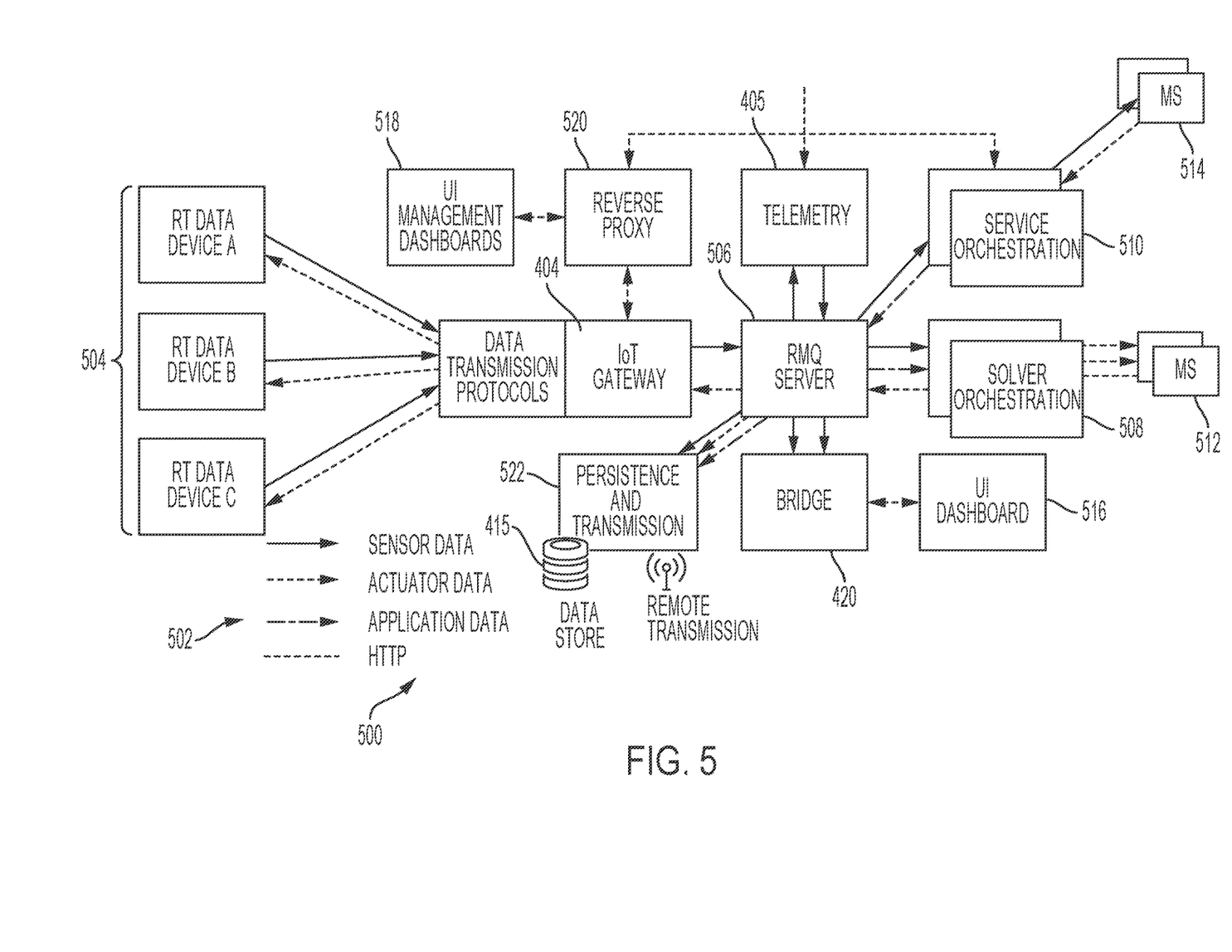
FIG. 5 is a diagram showing a data flow for the software architecture shown in FIG. 4 according to some aspects of the disclosure.

FIG. 5 is a diagram showing a data flow 500 for the software architecture shown in FIG. 4 according to some aspects of the disclosure. Key 502 indicates which data paths are for sensor data, which data paths are for actuator data, which data paths are for application data, and which data paths are for HTTP data. IoT gateway 404 uses data transmission protocols to send and receive real-time (RT) data to and from devices 504, each of which can be a sensor or an actuator. RMQ server 506 is maintained by processor 204 using computer program instructions 211 and is communicatively coupled to solver orchestration routines 508 and service orchestration routines 510, which are communicatively coupled with microservices 512 and 514. Bridge 420 communicates with UI dashboard 516, which is part of the microservice and service repository 416. UI management dashboards 518 are also part of microservice and service repository 416. Processor 204 also maintains a reverse proxy 520. Persistence and transmission functions 522 are maintained by the persistence or service API 414.

Figure 6:
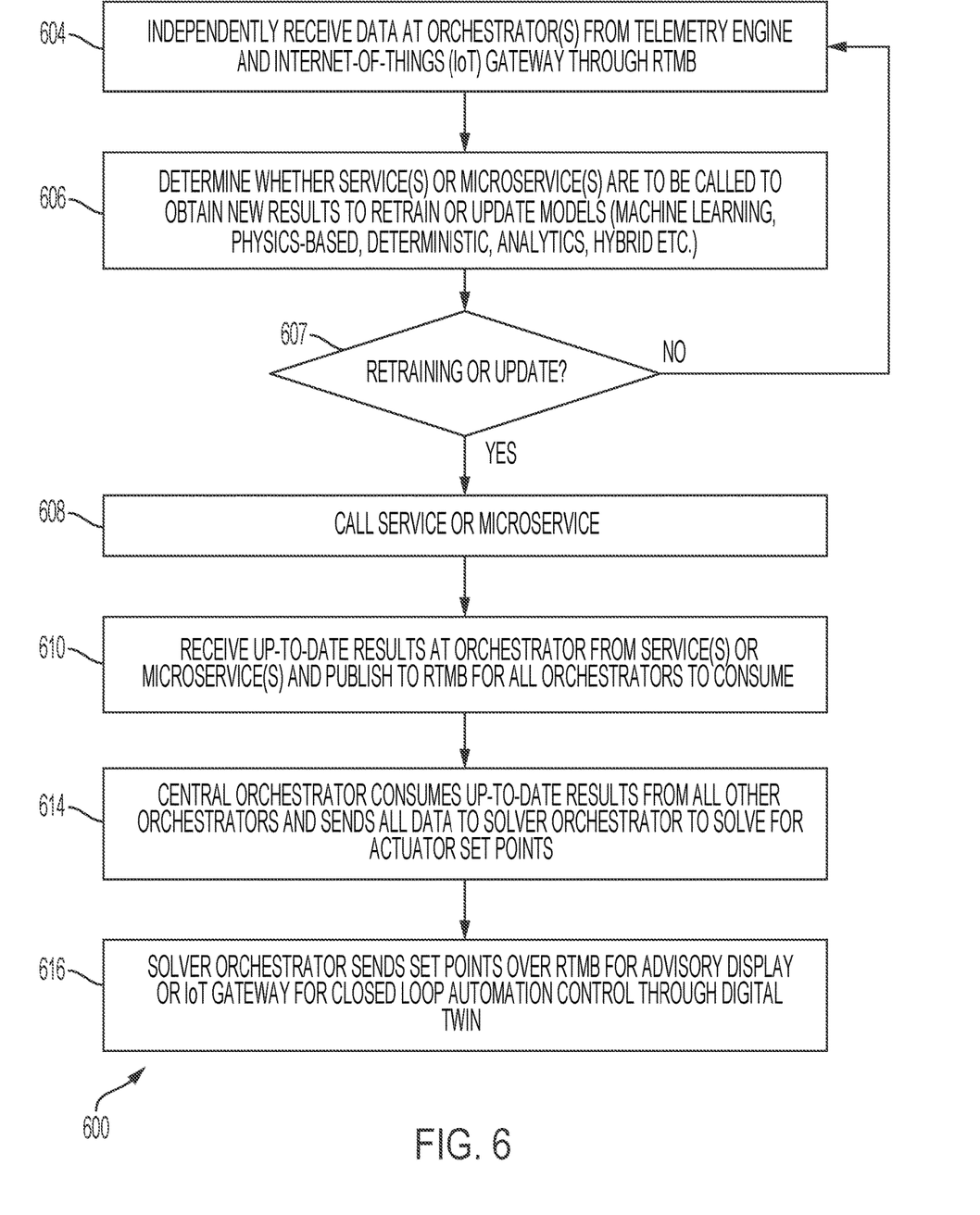
FIG. 6 is a flowchart of another process for real-time asynchronous control of a drilling tool according to some aspects of the disclosure.

FIG. 6 is a flowchart of another process 600 for real-time asynchronous control of a drilling tool according to some aspects of the disclosure. At block 604, the system independently receives data at orchestrator(s) from the telemetry engine 405 and IoT gateway 404 through RTMB 221. At block 606, an orchestrator determines whether a service or microservice is to be called to obtain new results to retrain or update models. The models can include machine-learning models as well as engineering models that may be physics-based, deterministic, analytics-based, or a hybrid model. A hybrid model is based on a machine-learning model and one or more other models. If no retraining or updating is needed at block 607, processing returns to block 604. Otherwise, processing proceeds to block 608, where the orchestrator will call the service and wait for results. The orchestrator receives the up to date results at block 610 and publishes the results onto the RTMB for other orchestrators or services to consume. Each orchestrator runs independently and will not block or add latency to other orchestrators or services. The orchestrators form a distributed system for objective-based optimization to solve for an objective or multiple objectives, such as maximizing ROP while minimizing MSE. Services can also retrieve data from historical files in data store 415. This data can include previous data from the current optimization activity, or data from past activities. This data is useful either when services come online and need to determine context, or when services need additional data to augment their model training or calculation inputs.

Still referring to FIG. 6, at block 614, the central orchestrator consumes the up-to-date results output from the other orchestrators and applies this information to solving for actuator set points. The solver orchestrator will select the best model for meeting an objective and apply constraints to possible set points based on the engineering calculations that have been run as part of the model orchestration. After solving, the set points are sent back over the RTMB 221 at block 616 where the set points can be consumed by UI dashboards for advisory display or sent out through the IoT gateway for closed loop automation control, possibly by controlling a digital twin.

By utilizing a digital twin of the equipment, predictions for future points in time can be calculated in advance. The central orchestrator can receive requests for data corresponding to future timestamps and use its aggregate knowledge of a combination of the current state of the system, historical information, and forward looking models to provide estimates of optimal set points. These set points in some aspects can be both sent to a UI for monitoring (deviation from nominal operational health-state) and be sent early to control systems that will check for the possibility of failure from invalid settings. This aggregate knowledge of the current state of the system and environmental awareness allows the digital twin to adapt and learn, thus improving on its prediction accuracy for estimates of optimal set points.

The uncertainty in model prediction for the estimates of optimal set points can be quantified by two characteristics in the learning process, namely, error and noise. These two characteristics have significant influence on the accuracy of the digital twin's predictions and ability to learn. An error measurement can be used to quantify how well each prediction from the hypothesis (e.g. the digital twin) approximates the targeted function (e.g. the true value). According to some aspects, data generated for digital twin ingestion is not deterministic; they are generated in a noisy way such that the output (the prediction) is not uniquely determined by the input data. The system can compensate for the latter issue by using probabilistic techniques as opposed to deterministic techniques; an output distribution from the digital twin and input distribution for ingestion by the digital twin. Both distributions will allow for probabilistic affects as the digital twin learns.

Figure 7:
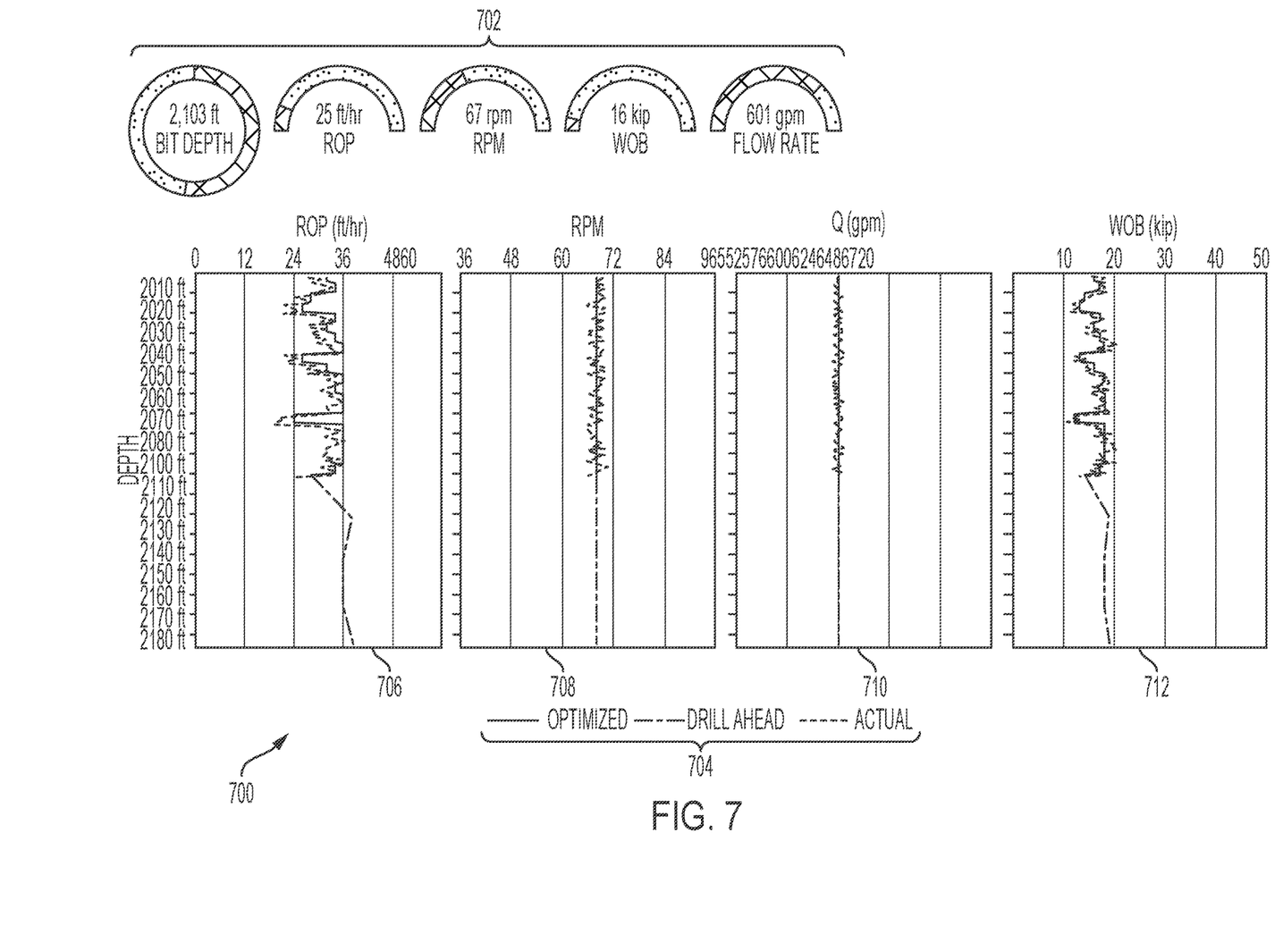
FIG. 7, FIG. 8, and FIG. 9 are screen displays that may be produced by a system for real-time asynchronous control of a drilling tool according to some aspects of the disclosure.

Multiple user interface (UI) dashboards can be used to facilitate operation of the distributed system. FIG. 7 shows a dashboard 700 that can serve as a real-time display, which targets an end user monitoring the activity of apps running on the platform or taking advice in order to manually set control points on equipment. Virtual gauges 702 indicate current values for depth, ROP, speed in RPM, weight-on-bit (WOB), and mud flow rate. Historical values are graphed against depth, using different lines for optimized values, drill-ahead values, and actual values, as indicated by key 704. Historical values for ROP are graphed in box 706. Historical values for drill speed in RPM are graphed in box 708. Historical values for flow (Q) in GPM are graphed in box 710, and historical values for WOB are graphed in box 712.

Figure 8:
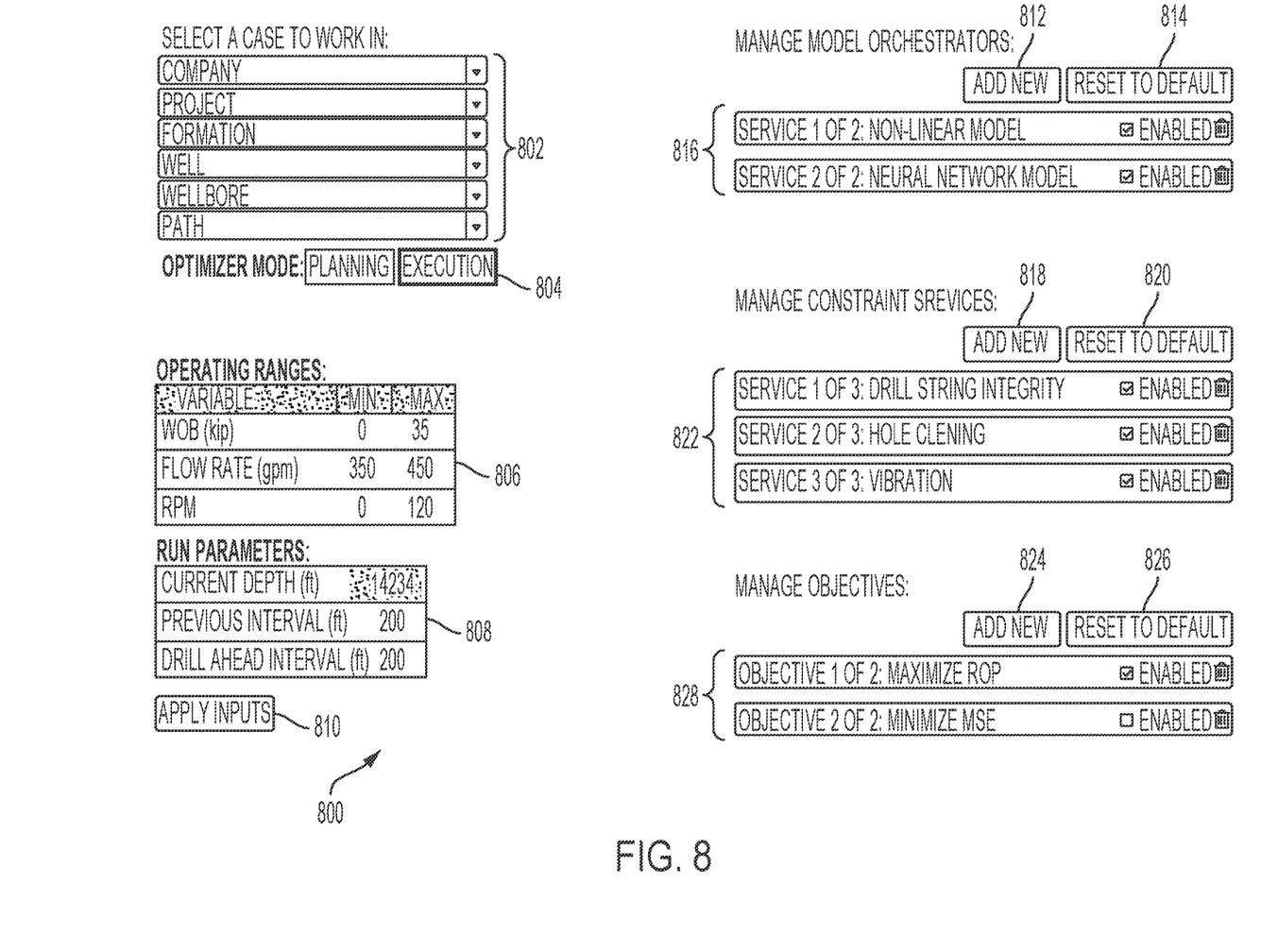

FIG. 8 shows a dashboard 800 that contains inputs for components in the system and the ability to manage available services and orchestrators, was well as controls that that have been activated. Drop-down boxes 802 allow the user to define a "case." A case is a combination of identifying information such as project, formation, well, etc. that allows data to be stored and retrieved later. Radio buttons 804 allow the user to define the optimizer mode as a planning mode or an execution mode. Panel 806 allows the user to input operating ranges for WOB, flow rate, and RPM. Panel 808 allows the user to input a relevant run parameter or parameters, in this case, depth is the parameter that applies. The supplied inputs can be applied with button 810.

Still referring to FIG. 8, the right side of dashboard 800 provides controls to manage orchestrators, constraint services, and objectives. New orchestrators can be added to the dashboard with button 812 and button 814 restores the included orchestrators to the default configuration. Panel 816 lists the orchestrators and each one can be enabled by checking a box. New constraint services can be added to the dashboard with button 818 and button 820 restores the included constraint services to the default configuration. Panel 822 lists the constraint services and each one can be enabled by checking a box. New objectives can be added to the dashboard with button 824 and button 826 restores the included objectives to the default configuration. Panel 828 lists the objectives and each one can again be enabled by checking a box.

Figure 9:
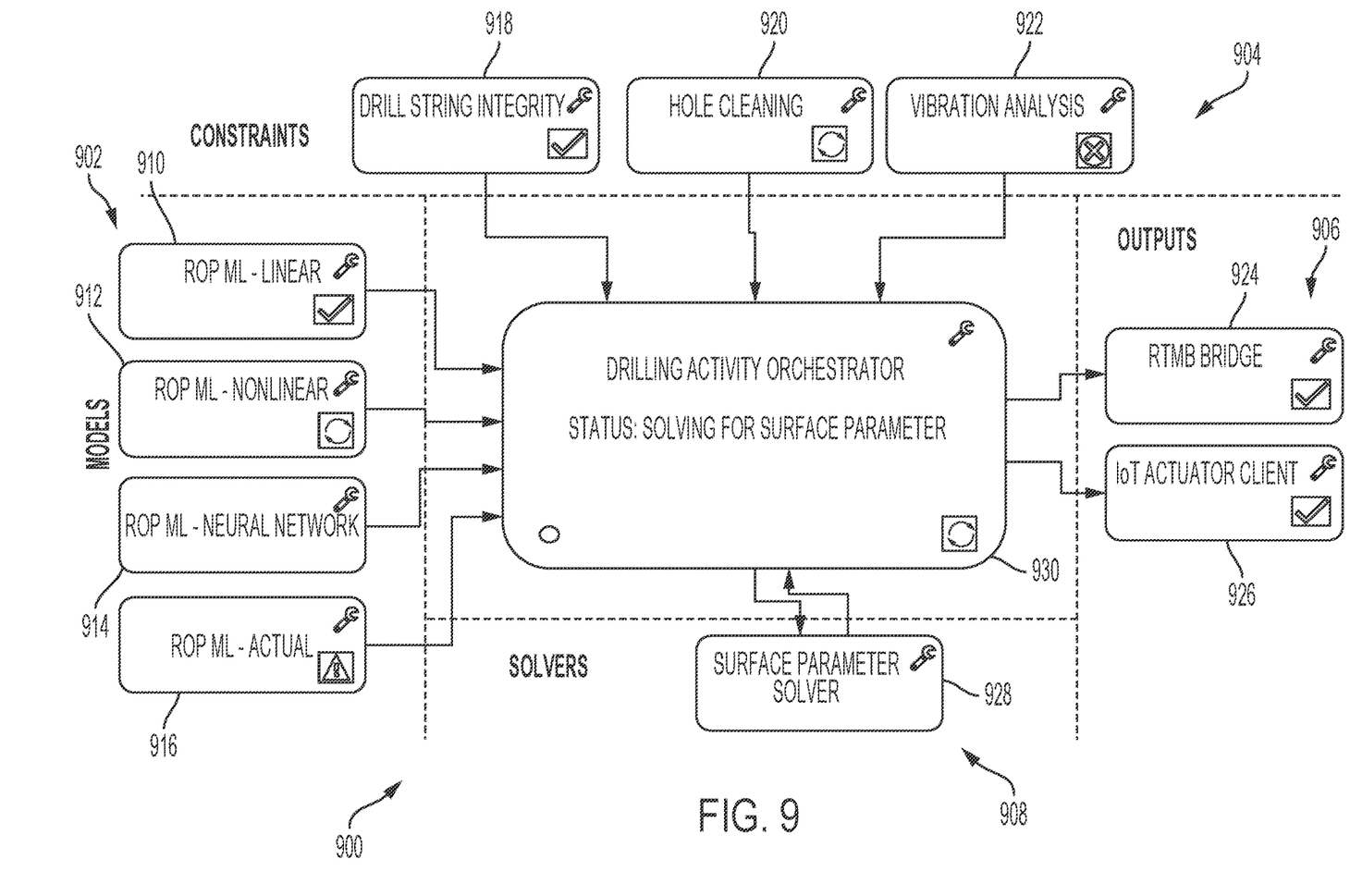

FIG. 9 is a screenshot of a user interface display 900 that shows a dashboard that can be used to monitor the status and health of services and orchestrators according to some aspects of the disclosure. Display 900 includes panels organized around related categories. Model indicators are displayed in panel 902. Constraint indicators are displayed in panel 904. Output indicators are displayed in panel 906, and solver indicators are displayed in panel 908. Model indicators include indicator 910 for the ROP machine-learning (ML) linear model, indicator 912 for the ROP ML nonlinear model, indicator 914 for an ROP ML neural network model, and indicator 916 for ROP ML actual values being applied. Constraint indicators include indicator 918 for drill string integrity, indicator 920 for hole cleaning, and indicator 922 for vibration analysis. Output indicators include indicator 924 for the status of bridge 420 and indicator 926, which provides the status of the actuator client within IoT gateway 404. Indicator 928 is for a solver orchestrator that is solving for surface parameters. The indicator 930, in the middle of the display, was selected for status display and all other indicators shown are related to drilling activity solutions for surface parameters being determined by the drilling activity orchestrator.

Still referring to FIG. 9, each indicator includes a status flag in the lower right hand corner of the graphical element. The flat in the vibration analysis indicator 922 indicates a problem with the vibration analysis. The check mark displayed in drill string integrity indicator 918 indicates the status is normal, but no work is being done by the software that provides the drill string integrity constraint at this time.

The status flag of rotating arrows as shown in hole cleaning indicator 920 indicates that software involved in providing this function is currently executing operations.

Terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. Additionally, comparative, quantitative terms such as "above," "below," "less," and "greater" are intended to encompass the concept of equality, thus, "less" can mean not only "less" in the strictest mathematical sense, but also, "less than or equal to."

Unless specifically stated otherwise, it is appreciated that throughout this specification that terms such as "processing," "calculating," "determining," "operations," or the like refer to actions or processes of a computing device, such as the controller or processing device described herein, that can manipulate or transform data represented as physical electronic or magnetic quantities within memories, registers, or other information storage devices, transmission devices, or display devices. The order of the process blocks presented in the examples above can be varied, for example, blocks can be re-ordered, combined, or broken into sub-blocks. Certain blocks or processes can be performed in parallel. The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Elements that are described as "connected," "connectable," or with similar terms can be connected directly or through intervening elements.

In some aspects, a system for providing distributed control using asynchronous services is provided according to one or more of the following examples. As used below, any reference to a series of examples is to be understood as a reference to each of those examples disjunctively (e.g., "Examples 1-4" is to be understood as "Examples 1, 2, 3, or 4").

Example 1. A system includes wellbore equipment positionable in a wellbore, a processing device communicatively coupled to the wellbore equipment, and a non-transitory memory device including instructions that are executable by the processing device to cause the processing device to perform operations. The operations include asynchronously receiving telemetry by at least one orchestrator of multiple orchestrators communicatively coupled to a real-time messaging bus; calling a service to obtain results based on the telemetry, publishing the results on the real-time messaging bus for the orchestrators to consume, retraining or updating at least one model distributed among the plurality of orchestrators using the results, solving for an objective using the at least one model to produce set points for controlling the wellbore equipment, and sending the set points to an advisory display or the wellbore equipment over the real-time messaging bus.

Example 2. The system of example 1 wherein the set points are sent to the wellbore equipment through a digital twin communicatively coupled to the real-time messaging bus.

Example 3. The system of example(s) 1-2 wherein the operations further include receiving telemetry data at an Internet-of-things (IoT) gateway, removing statistical outlier data points from the telemetry data, smoothing the telemetry data across multiple frequencies to produce telemetry, and sending the telemetry over the real-time messaging bus.

Example 4. The system of example(s) 1-3 wherein the set points are sent to the wellbore equipment through the IoT gateway.

Example 5. The system of example(s) 1-4 wherein solving for the objective includes solving for multiple objectives simultaneously.

Example 6. The system of example(s) 1-5 wherein solving for the objective further includes receiving results from the orchestrators at a central orchestrator and forwarding the results from the central orchestrator to a solver orchestrator.

Example 7. The system of example(s) 1-6 wherein the wellbore equipment includes a drilling tool and wherein the at least one model is a machine-learning model, a physics-based model, a deterministic model, an analytics-based model, a hybrid model or a combination of any or all of these models.

Example 8. A method includes asynchronously receiving telemetry by at least one of multiple orchestrators communicatively coupled to a real-time messaging bus, calling, by a processor, a service to obtain results based on the telemetry, publishing the results on the real-time messaging bus for the orchestrators to consume, retraining or updating, by the processor, at least one model distributed among the plurality of orchestrators using the results, solving, by the processor, for an objective using the at least one model to produce set points for controlling wellbore equipment positioned in a wellbore, and sending the set points to an advisory display or a drilling tool over the real-time messaging bus.

Example 9. The method of example 8 wherein the set points are sent to the drilling tool by sending the set points to a digital twin of the drilling tool communicatively coupled to the real-time messaging bus.

Example 10. The method of example(s) 8-9 further includes receiving telemetry data at an Internet-of-things (IoT) gateway, removing statistical outlier data points from the telemetry data, smoothing the telemetry data across multiple frequencies to produce telemetry, and sending the telemetry over the real-time messaging bus.

Example 11. The method of example(s) 8-10 wherein solving for the objective includes solving for multiple objectives simultaneously.

Example 12. The method of example(s) 8-11 wherein solving for the objective further includes receiving results from the orchestrators at a central orchestrator and forwarding the results from the central orchestrator to a solver orchestrator.

Example 13. The method of example(s) 8-12 wherein the at least one model includes a machine-learning model, a physics-based model, a deterministic model, an analytics-based model, a hybrid model or a combination of any or all of these models.

Example 14. A non-transitory computer-readable medium includes instructions that are executable by a processor for causing the processor to perform operations related to real-time asynchronous control of wellbore equipment. The operations include asynchronously receiving telemetry by at least one of multiple orchestrators communicatively coupled to a real-time messaging bus, calling a service to obtain results based on the telemetry, publishing the results on the real-time messaging bus for the orchestrators to consume, retraining or updating at least one model distributed among the plurality of orchestrators using the results, solving for an objective using the at least one model to produce set points for controlling wellbore equipment positionable in a wellbore, and sending the set points to an advisory display or the wellbore equipment over the real-time messaging bus.

Example 15. The non-transitory computer-readable medium of example 14 wherein the set points are sent to the wellbore equipment through a digital twin communicatively coupled to the real-time messaging bus.

Example 16. The non-transitory computer-readable medium of example(s) 14-15 wherein the operations further include receiving telemetry data at an Internet-of-things (IoT) gateway, removing statistical outlier data points from the telemetry data, smoothing the telemetry data across multiple frequencies to produce telemetry, and sending the telemetry over the real-time messaging bus.

Example 17. The non-transitory computer-readable medium of example(s) 14-16 wherein the set points are sent to the wellbore equipment through the IoT gateway.

Example 18. The non-transitory computer-readable medium of example(s) 14-17 wherein solving for the objective includes solving for multiple objectives simultaneously.

Example 19. The non-transitory computer-readable medium of example(s) 14-18 wherein solving for the objective further includes receiving results from the orchestrators at a central orchestrator, and forwarding the results from the central orchestrator to a solver orchestrator.

Example 20. The non-transitory computer-readable medium of example(s) 14-19 wherein the at least one model includes a machine-learning model, a physics-based model, a deterministic model, and analytics-based model, a hybrid model, or a combination of any or all of these models.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A system comprising:
   wellbore equipment positionable in a wellbore;
   a processing device communicatively coupled to the wellbore equipment; and
   a non-transitory memory device comprising instructions for a first orchestrator, wherein the first orchestrator is executable by the processing device to cause the first orchestrator to perform operations comprising:
   asynchronously receiving telemetry from a real-time messaging bus;
   calling a service to obtain results based on the telemetry, wherein the service is separate from the first orchestrator;
   publishing the results on the real-time messaging bus for the a plurality of orchestrators to consume;
   retraining or updating, using the results, a model accessible to the first orchestrator, wherein the model is distinct from the first orchestrator;
   solving for an objective using the model to produce set points for controlling the wellbore equipment; and
   sending the set points to an advisory display or the wellbore equipment over the real-time messaging bus.

2. The system of claim 1 wherein the set points are sent to the wellbore equipment through a digital twin communicatively coupled to the real-time messaging bus.

3. The system of claim 1 wherein the operations further comprise:
   receiving telemetry data at an Internet-of-things (IoT) gateway.

4. The system of claim 3 wherein the set points are sent to the wellbore equipment through the IoT gateway.

5. The system of claim 1 wherein solving for the objective comprises solving for multiple objectives simultaneously.

6. The system of claim 1 wherein solving for the objective further comprises:
   receiving the results from the plurality of orchestrators at a central orchestrator; and
   forwarding the results from the central orchestrator to a solver orchestrator.

7. The system of claim 1 wherein the wellbore equipment comprises a drilling tool and wherein the model comprises at least one of a machine-learning model, a physics-based model, a deterministic model, an analytics-based model, or a hybrid model.

8. A method comprising:
   asynchronously receiving, by a first orchestrator, telemetry from a real-time messaging bus;
   calling, by the first orchestrator, a service to obtain results based on the telemetry, wherein the service is separate from the first orchestrator;
   publishing, by the first orchestrator, the results on the real-time messaging bus for a plurality of orchestrators to consume;
   retraining or updating, by the first orchestrator and using the results, a model accessible to the first orchestrator, wherein the model is distinct from the first orchestrator;
   solving, by the first orchestrator, for an objective using the model to produce set points for controlling wellbore equipment positioned in a wellbore; and
   sending, by the first orchestrator, the set points to an advisory display or a drilling tool over the real-time messaging bus.

9. The method of claim 8 wherein the set points are sent to the drilling tool by sending the set points to a digital twin of the drilling tool communicatively coupled to the real-time messaging bus.

10. The method of claim 8 further comprising:
    receiving telemetry data at an Internet-of-things (IoT) gateway;
    removing statistical outlier data points from the telemetry data;
    smoothing the telemetry data across a plurality of frequencies to produce the telemetry; and
    sending the telemetry over the real-time messaging bus.

11. The method of claim 8 wherein solving for the objective comprises solving for multiple objectives simultaneously.

12. The method of claim 8 wherein solving for the objective further comprises:
    receiving the results from the plurality of orchestrators at a central orchestrator; and
    forwarding the results from the central orchestrator to a solver orchestrator.

13. The method of claim 8 wherein the model comprises at least one of a machine-learning model, a physics-based model, a deterministic model, an analytics-based model, or a hybrid model.

14. A non-transitory computer-readable medium that includes instructions that are executable by a processor for causing the processor to perform operations related to real-time asynchronous control of wellbore equipment, the operations comprising:

asynchronously receiving telemetry by a first orchestrator of a plurality of orchestrators communicatively coupled to a real-time messaging bus;

calling a service to obtain results based on the telemetry, wherein the service is separate from the first orchestrator;

publishing the results on the real-time messaging bus for the plurality of orchestrators to consume;

retraining or updating, using the results, a model accessible to the first orchestrator of the plurality of orchestrators, wherein the model is distinct from the plurality of orchestrators and the service;

solving for an objective using the model to produce set points for controlling wellbore equipment positionable in a wellbore; and sending the set points to an advisory display or the wellbore equipment over the real-time messaging bus.

15. The non-transitory computer-readable medium of claim 14 wherein the set points are sent to the wellbore equipment through a digital twin communicatively coupled to the real-time messaging bus.

16. The non-transitory computer-readable medium of claim 14 wherein the operations further comprise:

receiving telemetry data at an Internet-of-things (IoT) gateway;

removing statistical outlier data points from the telemetry data;

smoothing the telemetry data across a plurality of frequencies to produce the telemetry; and sending the telemetry over the real-time messaging bus.

17. The non-transitory computer-readable medium of claim 16 wherein the set points are sent to the wellbore equipment through the IoT gateway.

18. The non-transitory computer-readable medium of claim 14 wherein solving for the objective comprises solving for multiple objectives simultaneously.

19. The non-transitory computer-readable medium of claim 14 wherein solving for the objective further comprises:

receiving the results from the plurality of orchestrators at a central orchestrator; and forwarding the results from the central orchestrator to a solver orchestrator.

20. The non-transitory computer-readable medium of claim 14 wherein the model comprises at least one of a machine-learning model, a physics-based model, a deterministic model, and analytics-based model, or a hybrid model.

\* \* \* \* \*